(12) United States Patent
Kelly et al.

(10) Patent No.: US 7,705,272 B2
(45) Date of Patent: Apr. 27, 2010

(54) BOLT HEATER ASSEMBLY UNIT HAVING JUNCTION HOUSING CONFIGURATION

(75) Inventors: Michael W. Kelly, Joliet, IL (US); Laura B. Patterson, Joliet, IL (US); Glenn F. Jorgensen, Ridgewood, NJ (US)

(73) Assignee: Power House Tool, Inc., Joliet, IL (US)

( * ) Notice: Subject to any disclaimer, the term of this patent is extended or adjusted under 35 U.S.C. 154(b) by 144 days.

(21) Appl. No.: 11/462,169

(22) Filed: Aug. 3, 2006

(65) Prior Publication Data

US 2008/0029285 A1 Feb. 7, 2008

(51) Int. Cl.
*F16B 4/00* (2006.01)
*H05B 3/00* (2006.01)

(52) U.S. Cl. .......... 219/221; 219/50; 219/201; 219/523; 403/30; 174/50

(58) Field of Classification Search ........... 219/201, 219/221, 231, 233, 235, 523, 541; 403/28–30, 403/373–374.4; 411/395; 174/50
See application file for complete search history.

(56) References Cited

U.S. PATENT DOCUMENTS

| | | | | |
|---|---|---|---|---|
| 2,176,601 A | | 10/1939 | Bates | |
| D156,681 S | * | 12/1949 | Stone | D13/152 |
| 2,611,066 A | * | 9/1952 | Freeman | 219/523 |
| 2,726,316 A | * | 12/1955 | Visser et al. | 119/73 |
| 3,009,285 A | * | 11/1961 | Brown | 446/215 |
| 3,771,209 A | | 11/1973 | Bennett | |
| 4,027,572 A | * | 6/1977 | Burge | 411/436 |
| 4,235,652 A | * | 11/1980 | Brooks et al. | 156/71 |
| 4,717,792 A | * | 1/1988 | Sterritt et al. | 174/93 |
| 5,397,876 A | | 3/1995 | Shimamoto et al. | |
| D371,832 S | * | 7/1996 | Kelly | D23/332 |
| 6,348,674 B1 | * | 2/2002 | Russell | 219/243 |
| 6,871,403 B2 | * | 3/2005 | Clark | 30/53 |
| 2005/0167423 A1 | * | 8/2005 | Buschmann | 219/665 |

FOREIGN PATENT DOCUMENTS

DE 3914515 A1 * 11/1990
EP 928660 A1 * 7/1999

* cited by examiner

*Primary Examiner*—Stephen J. Ralis
(74) *Attorney, Agent, or Firm*—Greer, Burns & Crain, Ltd.

(57) ABSTRACT

A bolt heater including a junction housing, a handle attached and secured to a wall of the housing solely from an exterior of the housing, such as by a threaded connection, a power cable including a fitting attached directly to the wall of the housing, and an electrical resistance heater rod attached to the wall of the housing. The wall may have a boss with a recess therein for receiving a portion of the handle. The housing may be a hollow cylinder with a circular top wall, a circular bottom wall, and a cylindrical side wall. The heater rod may be attached to the housing via a threaded connection and the housing may have a non-circular portion near the threaded connection point, the non-circular portion being engageable by a tool to assist in the threading attachment of the heater rod to the housing.

22 Claims, 3 Drawing Sheets

BOLT HEATER ASSEMBLY UNIT HAVING JUNCTION HOUSING CONFIGURATION

BACKGROUND OF THE INVENTION

The present invention relates to bolt heaters.

The present invention has a particular application to bolt heaters used in the heating of studs or bolts, such as the bolts of a steam turbine casing. Although the invention is not limited to such an application, the invention will be described in such an environment and use.

It is desirable to heat the bolts used in a steam turbine casing during the fastening and unfastening thereof in that the bolt will elongate due to expansion during heating, allowing the nut to be threaded onto the bolt to a greater degree during the fastening process. When the bolt cools and shrinks, the nut is pulled tighter against the surrounding surface, thus assuring a secure fasting of the nut on the bolt and a clamping of the parts held together by the nut and bolt. In order to ease the removal of the nut from the bolt, such as during the servicing of the turbine, it is helpful to again heat the bolt to elongate it, in order to move the nut away from the surrounding surface, or at least to lessen the force holding the nut against that surface.

It has long been known to heat bolts, for example see U.S. Pat. No. 2,176,601, and to use induction heating to heat such bolts, for example, see U.S. Pat. Nos. 3,771,209 and 5,397,876.

Commonly available resistance type bolt heaters have a junction box, typically a standard hardware type box, to which is attached a handle, a power cable, and a resistance heating element. The resistance type bolt heater presently sold by Power House Tools, Inc., an assignee of the present invention, includes these components, in which the handle has a threaded stud projecting from one end, which is inserted through a non-threaded opening in a removable cover of the junction box, and is held in place on the cover by means of a nut which is secured to the stud from an inside side of the cover. The power cable is attached to an insert which is threaded to the side wall of the junction box, and the resistance heating element is threadingly attached to a bottom of the junction box. Individual wires from the power cable are connected to conductors on the resistance heating element inside the junction box. A power indicator lamp is supplied on the cover to indicate when the resistance heater is being supplied with power.

A standard junction box has several shortcomings which detract from its usefulness as part of a resistance type bolt heater. For example, by requiring the handle to be secured from the inside of the cover adds time required for assembly. The covers have a relatively thin wall thickness which detracts from the stability of the handle/junction box connection, and is insufficiently thick to support a threaded connection of the handle to the cover. The use of a separate insert component for attaching the power cable to the side wall of the junction box adds to assembly time, and becomes a potential point of weakness in the connection of the power cable to the junction box. The attachment of the resistance heater rod to the junction box can be made directly only when a three quarter inch resistance rod is used. When larger resistance rods are used, an adapter piece must be attached to the junction box, and then the rod attached to the adaptor piece, also becoming a potential point of weakness in the connection of the resistance rod to the junction box.

It would be an advance in the art if there were provided an easy to assemble bolt heater which would overcome one or more of the problems and limitations discussed above.

SUMMARY OF THE INVENTION

The present invention provides a bolt heater comprising a junction housing, a handle, a power cable, and an electrical resistance heater rod.

In an embodiment, the handle may have an externally threaded portion for connecting to an internally threaded opening in a wall of the junction housing.

In an embodiment, the junction housing may have a wall thickness sufficient to support a threaded connection of the handle to the junction housing.

In an embodiment, the handle may have a projecting threaded stud for threadingly connecting to the top wall of the junction housing.

In an embodiment, the handle may be attached and secured to a wall of the junction housing solely from an exterior of the junction housing.

In an embodiment, the power cable may include a fitting having external threads for connecting to an internally threaded opening in a wall of the junction housing.

In an embodiment, the power cable and fitting may be attached and secured to a wall of the junction housing solely from an exterior of the junction housing.

In an embodiment, the power cable and fitting may attach directly to the wall of the junction housing.

In an embodiment, the heater rod may have an end portion with external threads for connecting to an internally threaded opening in a wall of the junction housing.

In an embodiment, the heater rod may have a non-circular portion near the threaded end for engagement by a tool to assist in the threading attachment of the heater rod to the junction housing.

In an embodiment, the heater rod may be attached and secured to a wall of the junction housing solely from an exterior of the junction housing.

In an embodiment, the junction housing may comprise a body and a top wall, with the top wall removably connected to the body.

In an embodiment, the top wall may have a boss with a central recess therein for receiving a portion of the handle.

In an embodiment, the junction housing may comprise a hollow cylinder with a circular top wall, a circular bottom wall, and a cylindrical side wall.

In an embodiment, the junction housing may have a non-circular portion near the internally threaded opening for receiving the heater rod, the non-circular portion being engageable by a tool to assist in the threading attachment of the heater rod to the junction housing.

In an embodiment, the junction housing non-circular portion may comprise a projection formed on the bottom wall of the junction housing surrounding the threaded opening.

In an embodiment, the junction housing non-circular portion may comprise a recess formed in the bottom wall of the junction housing.

In an embodiment, the bolt heater may include an indicator lamp visible on the wall where the handle is attached.

In an embodiment, the indicator lamp may be an LED.

DETAILED DESCRIPTION OF THE PREFERRED EMBODIMENTS

Figure 1:
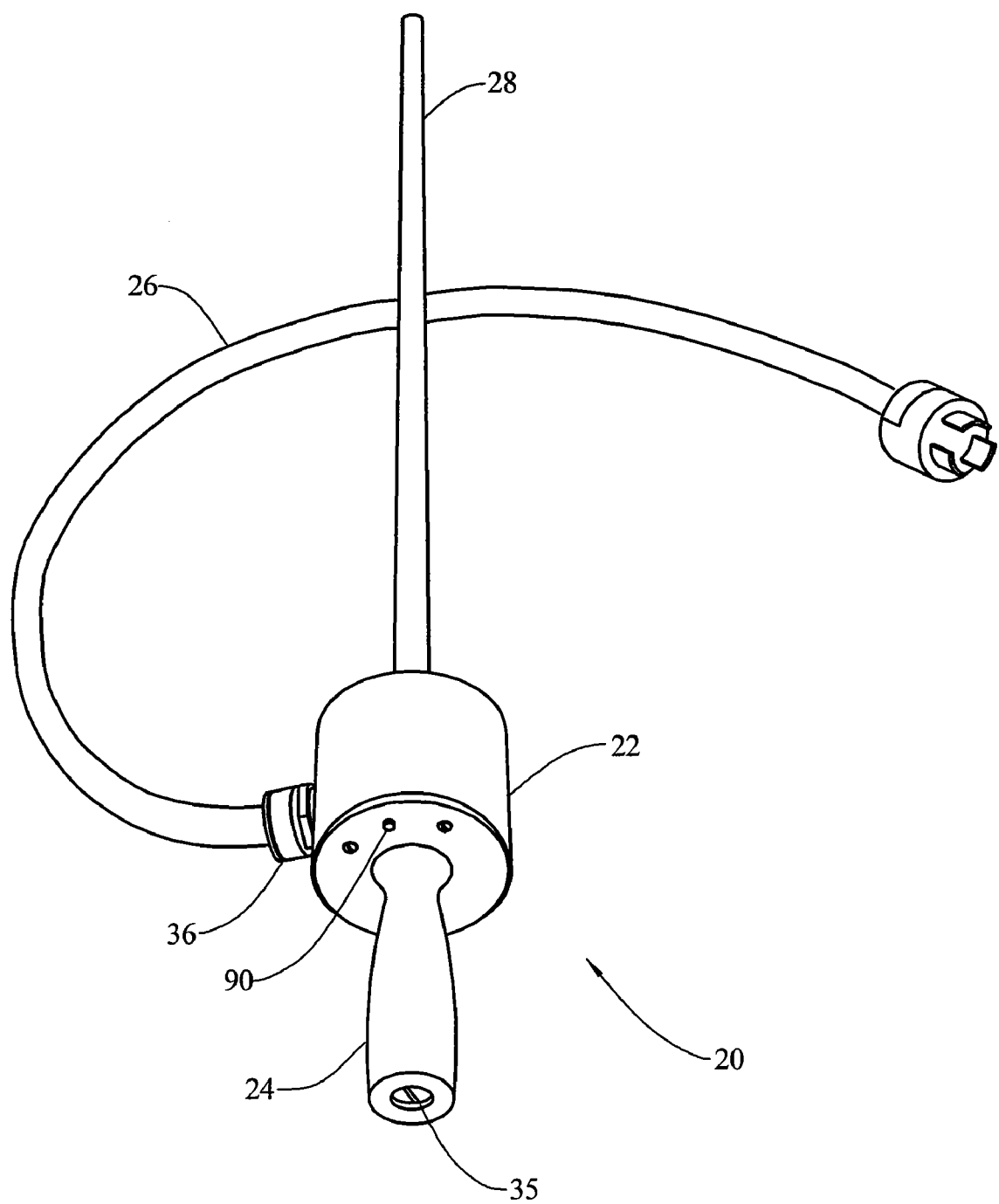
FIG. 1 is a handle end perspective view of a bolt heater embodying the principles of the present invention.

As illustrated in the Figures, the present invention provides a bolt heater 20 comprising a junction housing 22, a handle 24, a power cable 26, and an electrical resistance heater rod 28.

The handle 24 may have an externally threaded portion 30 for connecting to an internally threaded opening 32 in a wall 33 of the junction housing 22. For example, the externally threaded portion 30 may comprise a projecting threaded stud, as illustrated, or may comprise a threaded ring formed on an end 34 of the handle 24. In either arrangement, the wall 33 of the junction housing 22 would have a wall thickness sufficient to support the threaded connection of the handle 24 to the junction housing.

The handle 24 may be attached and secured to the wall 33 of the junction housing 22 solely from an exterior of the junction housing, without requiring any other attachments or connections from an interior of the junction housing, such as a separate nut positioned on the interior of the junction housing. The handle 24 may be attached by manually gripping the handle and rotating it relative to the wall 33 of the junction housing 22, or a tool receiving area 35 (FIG. 1), such as a slot for a screw driver, may be provided on the handle to assist in the secure attachment of the handle to the wall of the junction housing. The handle 24 could also be attached solely from the exterior of the junction housing 22 by other than a threaded connection, such as by a bayonet connection, or other secure and simple connection means.

Figure 3:
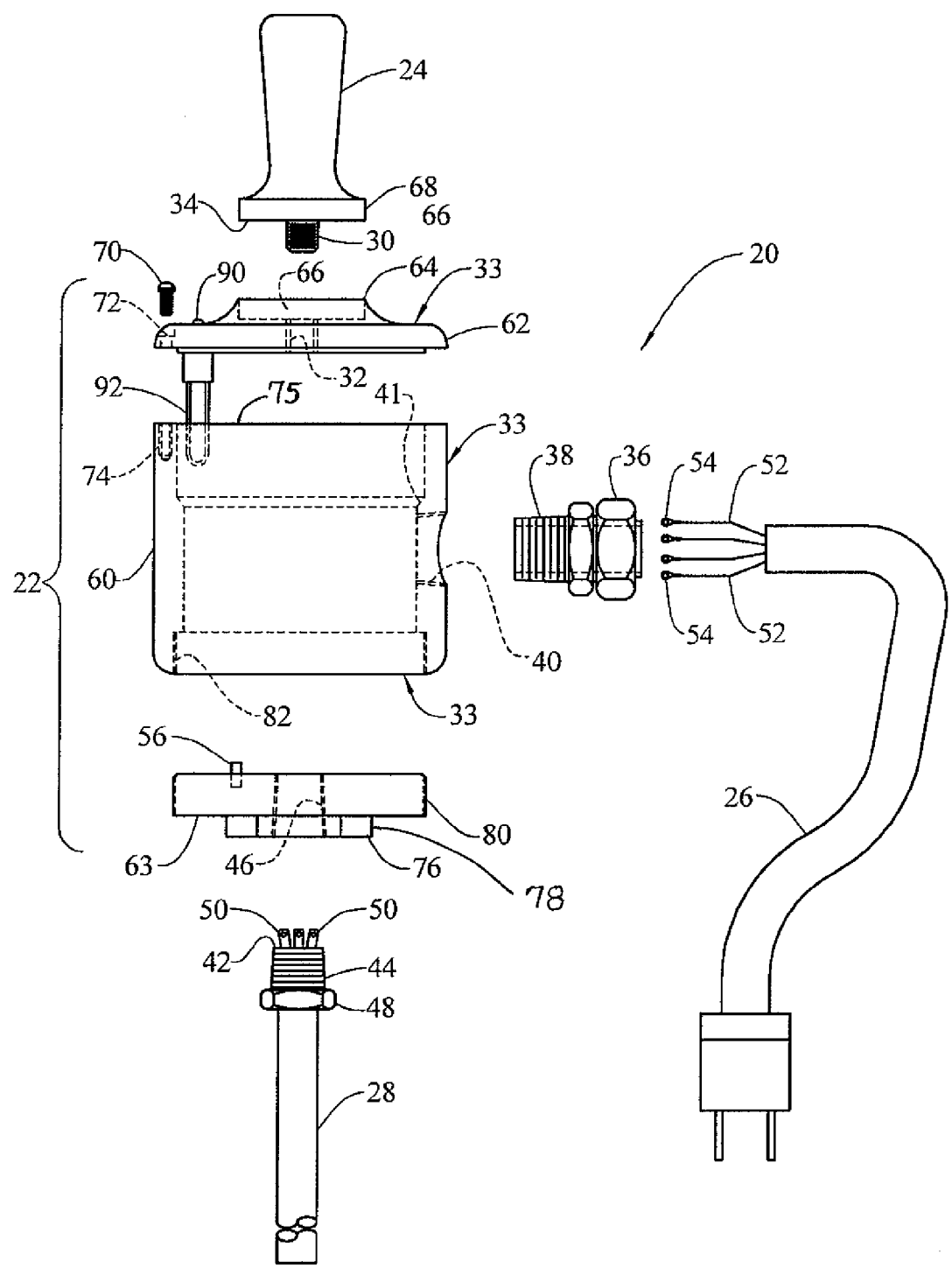
FIG. 3 is an exploded view of the components of the bolt heater of FIG. 1.

The power cable 26 may include a fitting 36 having external threads 38 (FIG. 3) for connecting to an internally threaded opening 40 in the wall 33 of the junction housing 22. In such an arrangement, the wall 33 of the junction housing 22 would have a wall thickness sufficient to support the threaded connection of the power cable 26 and fitting 36 to the junction housing. For example, the wall 33 may be stepped as at 41 to assure that the thickness in the area of the opening 40 is sufficient to support the threaded connection.

The power cable 26 and fitting 36 may be attached and secured to the wall 33 of the junction housing 22 solely from an exterior of the junction housing. The power cable 26 and fitting 36 may attach directly to the wall 33 of the junction housing 22 without any intervening adaptors or inserts. The power cable 26 and fitting 36 could also be attached solely from the exterior of the junction housing 22 by other than a threaded connection, such as by a bayonet connection, or other secure and simple connection means.

The heater rod 28 may have an end portion 42 with external threads 44 for connecting to an internally threaded opening 46 in the wall 33 of the junction housing 22. In such an arrangement, the wall 33 of the junction housing 22 would have a wall thickness sufficient to support the threaded connection of the heater rod 28 to the junction housing. The heater rod 28 may have a non-circular portion 48 near the threaded end 42 for engagement by a tool to assist in the threading attachment of the heater rod to the junction housing 22. The heater rod 28 may come in different diameters, depending upon the wattage and power of the heater, and the voltage supplied to the heater rod. For example, the rod may have a diameter of three quarters of an inch, one inch or one and a half inches. The internally threaded opening 46 should be sized to receive the particular size heater rod 28 that is being assembled to the junction housing 22 so that no separate adapters or connectors are required to assembly the heater rod to the junction housing. This would require different junction housings 22 for different heater rod sizes.

The heater rod 28 may be attached and secured to the wall 33 of the junction housing 22 solely from an exterior of the junction housing. The heater rod 28 could also be attached solely from the exterior of the junction housing 22 by other than a threaded connection, such as by a bayonet connection, or other secure and simple connection means.

The heater rod 28 includes a plurality of electrical conductors 50 which are connected to resistive heating elements in the heater rod. The power cable 26 also includes a plurality of electrical conductors 52 for supplying electric power to the heater rod 28. Depending on the voltage and number of phases of current being supplied and used by the heater rod 28, there may be 2 or 3 electrical conductors 50 at the heater rod, and 3 or 4 conductors 52 at the power cable 26. The electrical conductors 52 of the power cable 26 may be provided with terminals 54 which may be secured to the electrical conductors 50 of the heater rod 28 in a known manner. The power cable electrical conductors 52 also include a ground conductor which may be attached to a ground connection 56 at the wall 33 of the junction housing 22, to assure that the junction housing will be grounded.

The junction housing 22 may comprise a body 60, a top wall 62 and a bottom wall 63, with the top wall and the bottom wall removably connected to the body. This will allow access to the interior of the junction housing 22 to permit connection of the power cable conductors 52 to the heater rod conductors 50. The top wall 62 may have a boss 64 with a central recess 66 therein for receiving a portion 68 of the handle 24. A snug fit between the handle 24 and the recess 66 will provide a more secure and stable connection between the handle and the junction housing 22. The top wall 62 may be secured to the body 60 in various ways, such as via the use of a plurality of threaded fasteners 70 extending through openings 72 in the top wall and into holes 74 in an end wall 75 of the body. Alternatively, a threaded connection may be provided between the top wall 62 and the body 60, particularly where the top wall is circular and the body comprises a hollow cylinder, such as shown in the Figures. There could be provided a flange on the top wall 62 with an internal thread to mate with an external thread on the body 60, or an external thread on the top wall to mate with an internal thread on the body. The top wall 62 could also be secured to the body 60 with interlocking detents or other known connection arrangements.

Figure 2:
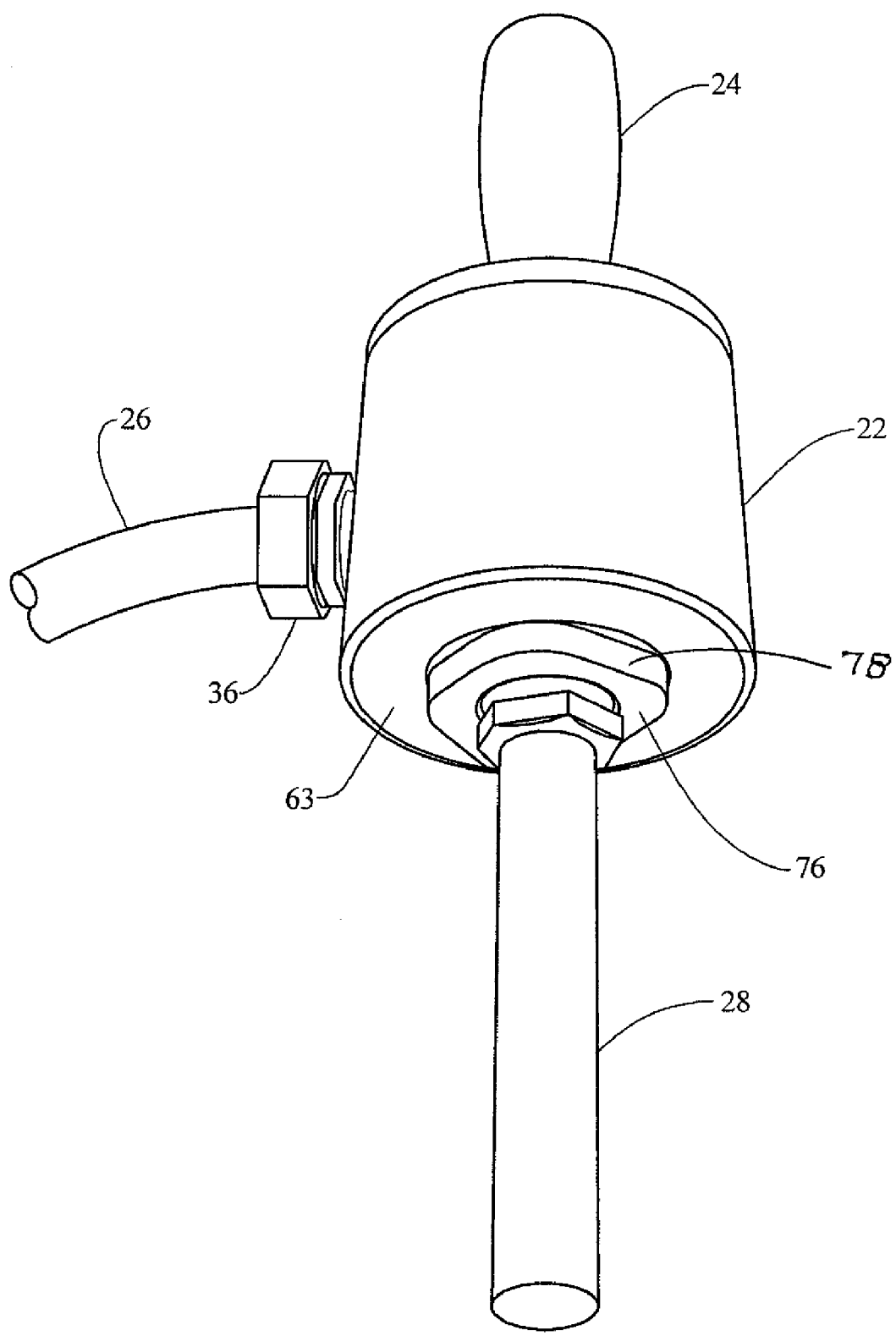
FIG. 2 is a resistance rod end perspective view of the bolt heater of FIG. 1.

In an embodiment, the bottom wall 63 may have a non-circular portion 76 (FIGS. 2 and 3) near the internally threaded opening 46 for receiving the heater rod 28, the non-circular portion being engageable by a tool to assist in the threading attachment of the heater rod to the junction housing. For example, the non-circular portion 76 may comprise a projection 78, such as a square or hex shaped projection, formed on the bottom wall 63 of the junction housing 22 surrounding the threaded opening 46. Alternatively, the non-circular portion 76 may comprise a recess or a series of recesses formed in the bottom wall 63 of the junction housing 22 to be engaged by a tool to prevent rotation of the junction housing 22 while the heater rod 28 is being threaded into the junction housing. The bottom wall 63 may have a circular perimeter 80 threaded to threadingly engage with an opening 82 at a bottom end of the body 60. The bottom wall 63 could also be secured to the body 60 with interlocking detents or other known connection arrangements.

The bolt heater 20 may include an indicator lamp 90 visible on the wall 33 where the handle 24 is attached. The indicator lamp 90 may have a conductor 92 directly or inductively connected to one of the power conductors 52 to provide a visual indication that power is being supplied to the heater rod 28. The indicator lamp 90 may be an LED, an incandescent bulb, or other type of visual indicator energized by power being supplied to the heater rod 28.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A bolt heater comprising:
 a junction housing comprising:
  a cylindrical body having an outer cylindrical surface of a constant outer diameter along substantially an entire length of the cylindrical body and a central passage therethrough centered about a central axis of the cylindrical body with a first completely open end and a second completely open end, the first completely open end of the central passage being circular and having a first internal diameter, the second completely open end of the central passage being circular and having a second internal diameter, and a section of the central passage between the first completely open end and the second completely open end being circular and having a third internal diameter, the third internal diameter being smaller than the first and second internal diameters,
  a first circular end wall with an outer diameter sized to engage the cylindrical body and to removably close the first completely open end,
  the first circular end wall having an outer circumference sized to coincide with an outer circumference of the cylindrical body such that an outer edge of the first circular end wall is flush with an outer surface of the cylindrical body,
  the first circular end wall having an axially extending boss with a lateral extent smaller than the outer diameter of the first circular end wall centered on the central axis and extending in a direction away from the cylindrical body,
  a second circular end wall with an outer diameter sized to engage the cylindrical body and to removably close the second completely open end,
  the second circular end wall having an axially extending projection with a non-circular perimeter having a lateral extent smaller than the outer diameter of the second circular end wall centered on the central axis and extending in a direction away from the cylindrical body,
  a first internally threaded opening with an outer diameter formed in the first circular end wall and centered on the central axis, an end of the first internally threaded opening being surrounded by a circular central recess in the axially extending boss having a diameter greater than the outer diameter of the first internally threaded opening and being centered on the central axis,
  a second internally threaded opening formed in a side wall of the cylindrical body in a portion of the cylindrical body corresponding to the section of the central passage having the third internal diameter,
  a third opening formed in the second circular end wall located in the axially extending projection and centered on the central axis,
 a handle having a manual gripping portion at a proximal end, an externally threaded portion at a distal end for connecting to the first internally threaded opening in the first circular end wall of the junction housing and a portion positioned between the manual gripping portion and the externally threaded portion which is circular and has a diameter greater than a diameter of the externally threaded portion and a diameter of the manual gripping portion,
 the central recess located in the axially extending boss of the first circular end wall being sized to snuggly receive the portion of the handle positioned between the manual gripping portion and the externally threaded portion,
 a power cable including a fitting having external threads for connecting to the second internally threaded opening in the side wall of the junction housing, and
 an electrical resistance heater rod having an end portion for connecting to the third opening in the second circular end wall of the junction housing.

2. A bolt heater according to claim 1, wherein the end portion of the heater rod is externally threaded, the third opening in the junction housing is internally threaded and the heater rod has a non-circular portion near the externally threaded end portion for engagement by a tool to assist in a threading attachment of the heater rod to the junction housing.

3. A bolt heater according to claim 1, wherein the handle is attached and held to the junction housing solely from an exterior of the junction housing.

4. A bolt heater according to claim 1, wherein the power cable is attached and held to the junction housing solely from an exterior of the junction housing.

5. A bolt heater according to claim 1, wherein the heater rod is attached and held to the junction housing solely from an exterior of the junction housing.

6. A bolt heater according to claim 1, wherein the indicator lamp is connected inductively to the power cable.

7. A bolt heater according to claim 1, further including an electrical ground connection provided in the junction housing when the first circular end wall and the second circular end wall are assembled with the cylindrical body.

8. A bolt heater according to claim 1, wherein the first circular end wall is secured via treaded fasteners to the cylindrical body.

9. A bolt heater comprising:
 a junction housing comprising a cylindrical body with a central passage therethrough centered about a central axis of the cylindrical body completely open at both ends, a removable circular bottom wall to close one open end and a removable circular top wall to close an opposite open end,
 the removable circular top wall having an outer circumference sized to coincide with an outer circumference of the cylindrical body such that an outer edge of the removable circular top wall is flush with an outer surface of the cylindrical body,
 the cylindrical body having an internal thread formed at the one open end arranged to threadingly engage with the removable circular bottom wall,
 the removable circular bottom wall having an external thread formed at an outer circumference thereof to engage with the internal thread at the one open end of the cylindrical body such that the removable circular bottom wall is wholly received within the cylindrical body,
 the removable circular top wall having a first internally threaded opening therein, the cylindrical body having a second internally threaded opening therein and the removable circular bottom wall having a third internally threaded opening therein, a handle having an externally threaded portion for connecting and securing the handle to the first internally threaded opening in the removable circular top wall of the junction housing, solely from an exterior of the junction housing, the removable circular top wall having a thickness in an area of the first internally threaded opening sufficient to support threaded connection of the handle to the removable circular top wall, the removable circular top wall having an axially extending boss with a lateral extent less than a diameter of the removable circular top wall centered on the central axis and extending in a direction away from the cylindrical body with a circular central recess in the axially extending boss for snuggly receiving a non-threaded portion of the handle as well as the first internally threaded opening which has a smaller diameter than the circular central recess, a power cable including a fitting having external threads for connecting and securing the power cable to the second internally threaded opening in the cylindrical body of the junction housing solely from the exterior of the junction housing, the cylindrical body of the junction housing having a thickness in the area of the second internally threaded opening to support the threaded connection of the power cable to the cylindrical body, an electrical resistance heater rod having an end portion with external threads for connecting and securing the electrical resistance heater rod to the third internally threaded opening in the removable circular bottom wall solely from an exterior of the junction housing, the removable circular bottom wall having a thickness in an area of the third internally threaded opening sufficient to support a threaded connection of the electrical resistance heater rod to the removable circular bottom wall, the removable circular bottom wall having a non-circular axially extending projection having a lateral dimension smaller than a diameter of the removable circular bottom wall within which is positioned the third internally threaded opening to permit engagement by a tool, to prevent rotation of the removable circular bottom wall when the electrical resistance heater rod is threadingly attached to the removable circular bottom wall, and an indicator lamp visibly exposed to an exterior of the removable circular top wall, the indicator lamp being in electrical communication with the power cable such that the indicator lamp is energized when electrical current is flowing through the power cable.

10. A bolt heater according to claim 9, wherein the removable circular top wall is secured via threaded fasteners to the cylindrical body.

11. A bolt heater according to claim 9, wherein the cylindrical body is stepped to provide an increased thickness of the cylindrical body in the area of the second internally threaded opening.

12. A bolt heater according to claim 9, wherein the indicator lamp is connected inductively to the power cable.

13. A bolt heater according to claim 9, further including an electrical ground connection provided in the junction housing when the removable circular top wall and the removable circular bottom wall are assembled with the cylindrical body.

14. A bolt heater according to claim 1, further including an indicator lamp visible on the first circular end wall having the first internally threaded opening.

15. A bolt heater according to claim 14, wherein the indicator lamp is an LED.

16. A bolt heater according to claim 9, wherein the handle includes a tool receiving area thereon.

17. A bolt heater according to claim 16, wherein the tool receiving area comprises a screw driver slot.

18. A bolt heater comprising:

a junction housing comprising a body formed of a cylindrical wall with two completely open ends defining a central passage centered about a central axis, a first completely open end of the cylindrical wall being circular and having a first internal diameter, the second completely open end of the cylindrical wall being circular and having a second internal diameter, and a section of the central passage between the first completely open end and the second completely open end being circular and having a third internal diameter, the third internal diameter being smaller than the first and second internal diameters, a removable circular bottom wall to close the second completely open end and a removable circular top wall to close the first completely open end, the removable circular top wall having an axially extending boss centered on the central axis with a lateral extent less than a diameter of the removable circular top wall and extending in a direction away from the cylindrical body with a first internally threaded opening centered on the central axis, the cylindrical wall having a second internally threaded opening therein in a portion of the cylindrical wall corresponding to the section of the central passage having the third internal diameter, the removable circular bottom wall having an axially extending projection centered on the central axis with a non-circular perimeter having a lateral dimension smaller than a diameter of the removable circular bottom wall and extending in a direction away from the cylindrical wall with a third internally threaded opening therein centered on the central axis, the cylindrical wall having an internal thread formed at the second completely open end arranged to threadingly engage with the removable circular bottom wall, the removable circular bottom wall having an external thread formed at an outer circumference thereof to engage with the internal thread at the second open end of the cylindrical wall such that the removable circular bottom wall is wholly received within the cylindrical wall, such that the removable circular bottom wall is threadingly attachable to and removable from the cylindrical wall, a handle having a tool receiving area, a manually graspable area at a proximal end and an externally threaded portion at a distal end for connecting and securing the handle to the first internally threaded opening in the removable circular top wall of the junction housing, solely from an exterior of the junction housing, and a portion positioned between the manually graspable area and the externally threaded portion which is circular and has a diameter greater than a diameter of the externally threaded portion and a diameter of the manually graspable area, the removable circular top wall having a central recess located in the axially extending boss being sized to snuggly receive the portion of the handle positioned between the manually graspable area and the externally threaded portion, and a thickness in an area of the first internally threaded opening being sufficient to support threaded connection of the handle to the removable circular top wall, a power cable including a fitting having external threads for connecting and securing the power cable to the second internally threaded opening in the body of the junction housing solely from an exterior of the junction housing, the body of the junction housing having a thickness in an area of the second internally threaded opening to support a threaded connection of the power cable to the cylindrical wall, the cylindrical wall of the body being stepped to provide an increased thickness of the wall in the area of the second threaded opening, an electrical resistance heater rod having an end portion with external threads for connecting and securing the electrical resistance heater rod to the third internally threaded opening in the axially extending projection on the removable circular bottom wall solely from an exterior of the junction housing, the removable circular bottom wall and the axially extending projection having a thickness in an area of the third internally threaded opening sufficient to support a threaded connection of the electrical resistance heater rod to the removable circular bottom wall, and an indicator lamp visibly exposed to an exterior of the removable circular top wall, the indicator lamp being in electrical communication with the power cable such that the indicator lamp is energized when electrical current is flowing through the power cable.

19. A bolt heater according to claim 18, wherein the tool receiving area comprises a screw driver slot.

20. A bolt heater according to claim 18, wherein the indicator lamp is connected inductively to the power cable.

21. A bolt heater according to claim 18, further including an electrical ground connection provided in the junction housing when the removable circular bottom wall and the removable circular top wall are assembled with the cylindrical wall.

22. A bolt heater according to claim 18, wherein the removable circular top wall is secured via threaded fasteners to the cylindrical wall.

* * * * *